United States Patent
Shah et al.

(10) Patent No.: US 9,052,901 B2
(45) Date of Patent: Jun. 9, 2015

(54) METHOD, APPARATUS, AND SYSTEM FOR ENERGY EFFICIENCY AND ENERGY CONSERVATION INCLUDING CONFIGURABLE MAXIMUM PROCESSOR CURRENT

(75) Inventors: Ketan R. Shah, Olympia, WA (US); Eric Distefano, Livermore, CA (US); Stephen H. Gunther, Beaverton, OR (US); Jeremy J. Shrall, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 540 days.

(21) Appl. No.: 13/326,105

(22) Filed: Dec. 14, 2011

(65) Prior Publication Data

US 2012/0216029 A1    Aug. 23, 2012

(51) Int. Cl.
*G06F 1/32* (2006.01)
*G06F 9/44* (2006.01)
*G06F 9/455* (2006.01)

(52) U.S. Cl.
CPC .............. *G06F 1/3243* (2013.01); *G06F 9/455* (2013.01); *G06F 9/4401* (2013.01); *G06F 9/4411* (2013.01); *G06F 1/3206* (2013.01); *G06F 1/324* (2013.01); *Y02B 60/32* (2013.01)

(58) Field of Classification Search
CPC ...... G06F 9/4411; G06F 9/4401; G06F 9/455
USPC ....................................................... 713/100
See application file for complete search history.

(56) References Cited

U.S. PATENT DOCUMENTS

| | | |
|---|---|---|
| 5,163,153 A | 11/1992 | Cole et al. |
| 5,522,087 A | 5/1996 | Hsiang |
| 5,590,341 A | 12/1996 | Matter |
| 5,621,250 A | 4/1997 | Kim |
| 5,931,950 A | 8/1999 | Hsu |
| 6,748,546 B1 | 6/2004 | Mirov et al. |
| 6,792,392 B1 | 9/2004 | Knight |
| 6,823,516 B1 | 11/2004 | Cooper |
| 6,829,713 B2 | 12/2004 | Cooper et al. |
| 6,996,728 B2 | 2/2006 | Singh |

(Continued)

FOREIGN PATENT DOCUMENTS

| | | |
|---|---|---|
| EP | 1 282 030 A1 | 5/2003 |
| WO | 2011104245 A1 | 9/2011 |

OTHER PUBLICATIONS

Controlled power company, Power commander series 900, Sep. 2009.*

(Continued)

*Primary Examiner* — Jaweed A Abbaszadeh
*Assistant Examiner* — Austin Hicks
(74) *Attorney, Agent, or Firm* — Trop, Pruner & Hu, P.C.

(57) ABSTRACT

An apparatus, method and system is described herein for providing multiple maximum current configuration options including corresponding turbo frequencies for a processing device. Available options for a processor are determined by initialization code. And based on platform electrical capabilities, an optimal one of the multiple current configuration options is selected. Moreover, during runtime another current configuration is dynamically selected based on current configuration considerations to provide high flexibility and best possible performance per part and computing platform.

19 Claims, 7 Drawing Sheets

| Icc max value | power event | platform electrical metric | Turbo Frequencies (active-->1core/2core/3core/4core) |
|---|---|---|---|
| 75A | x | 2 phase Voltage Regulator | 1000MHz, 900MHz, 500MHz, 100MHz |
| 112A | x | 3 phase Voltage Regulator | 1000MHz, 1000MHz, 900MHz, 700MHz |

520a

| Icc max value | power event | platform electrical metric | Turbo Frequencies (active-->1core/2core/3core/4core) |
|---|---|---|---|
| 25A | Remove A/C Brick + low power mode | 3 phase Voltage Regulator | 500MHz, 300MHz, 100MHz, 0MHz |
| 50A | low power mode | 3 phase Voltage Regulator | 700MHz, 600MHz, 400MHz, 200MHz |
| 75A | Add A/C Brick | 3 phase Voltage Regulator | 1000MHz, 1000MHz, 900MHz, 700MHz |

520b

Storage 510

Turbo module 515

505

(56) References Cited

U.S. PATENT DOCUMENTS

| | | | |
|---|---|---|---|
| 7,010,708 B2 | 3/2006 | Ma | |
| 7,043,649 B2 | 5/2006 | Terrell | |
| 7,093,147 B2 | 8/2006 | Farkas et al. | |
| 7,111,179 B1 | 9/2006 | Girson et al. | |
| 7,194,643 B2 | 3/2007 | Gonzalez et al. | |
| 7,272,730 B1 | 9/2007 | Acquaviva et al. | |
| 7,412,615 B2 | 8/2008 | Yokota et al. | |
| 7,434,073 B2 | 10/2008 | Magklis | |
| 7,437,270 B2 | 10/2008 | Song et al. | |
| 7,454,632 B2 | 11/2008 | Kardach et al. | |
| 7,529,956 B2 | 5/2009 | Stufflebeam | |
| 7,539,885 B2 | 5/2009 | Ma | |
| 7,730,340 B2 | 6/2010 | Hu et al. | |
| 7,739,531 B1 | 6/2010 | Krishnan | |
| 7,928,813 B1* | 4/2011 | Ao et al. | 332/100 |
| 2001/0020283 A1 | 9/2001 | Sakaguchi | |
| 2001/0044909 A1 | 11/2001 | Oh et al. | |
| 2002/0194509 A1 | 12/2002 | Plante et al. | |
| 2003/0061383 A1 | 3/2003 | Zilka | |
| 2004/0064752 A1 | 4/2004 | Kazachinsky et al. | |
| 2004/0098560 A1 | 5/2004 | Storvik et al. | |
| 2004/0139356 A1 | 7/2004 | Ma | |
| 2004/0268166 A1 | 12/2004 | Farkas et al. | |
| 2005/0022038 A1 | 1/2005 | Kaushik et al. | |
| 2005/0033881 A1 | 2/2005 | Yao | |
| 2005/0132238 A1 | 6/2005 | Nanja | |
| 2005/0289367 A1 | 12/2005 | Clark et al. | |
| 2006/0050670 A1 | 3/2006 | Hillyard et al. | |
| 2006/0053326 A1 | 3/2006 | Naveh | |
| 2006/0059286 A1 | 3/2006 | Bertone et al. | |
| 2006/0069936 A1 | 3/2006 | Lint et al. | |
| 2006/0117202 A1 | 6/2006 | Magklis et al. | |
| 2006/0184287 A1 | 8/2006 | Belady et al. | |
| 2007/0005995 A1 | 1/2007 | Kardach et al. | |
| 2007/0016817 A1 | 1/2007 | Albonesi et al. | |
| 2007/0079294 A1 | 4/2007 | Knight | |
| 2007/0106827 A1 | 5/2007 | Boatright et al. | |
| 2007/0156992 A1 | 7/2007 | Jahagirdar | |
| 2007/0214342 A1 | 9/2007 | Newburn | |
| 2007/0239398 A1 | 10/2007 | Song et al. | |
| 2007/0245163 A1 | 10/2007 | Lu et al. | |
| 2008/0028240 A1 | 1/2008 | Arai et al. | |
| 2008/0250260 A1 | 10/2008 | Tomita | |
| 2009/0006871 A1 | 1/2009 | Liu et al. | |
| 2009/0150695 A1 | 6/2009 | Song et al. | |
| 2009/0150696 A1 | 6/2009 | Song et al. | |
| 2009/0158061 A1 | 6/2009 | Schmitz et al. | |
| 2009/0158067 A1 | 6/2009 | Bodas et al. | |
| 2009/0172375 A1 | 7/2009 | Rotem et al. | |
| 2009/0172428 A1 | 7/2009 | Lee | |
| 2009/0235105 A1 | 9/2009 | Branover et al. | |
| 2010/0115309 A1 | 5/2010 | Carvalho et al. | |
| 2010/0146513 A1 | 6/2010 | Song | |
| 2010/0169609 A1 | 7/2010 | Finkelstein et al. | |
| 2010/0191997 A1 | 7/2010 | Dodeja et al. | |
| 2011/0154011 A1* | 6/2011 | Efraim et al. | 713/100 |
| 2011/0154090 A1 | 6/2011 | Dixon et al. | |
| 2011/0238973 A1* | 9/2011 | Allarey et al. | 713/100 |
| 2011/0239006 A1 | 9/2011 | Hsu et al. | |
| 2012/0079290 A1 | 3/2012 | Kumar | |
| 2012/0246506 A1 | 9/2012 | Knight | |
| 2013/0013911 A1* | 1/2013 | Gustafsson | 713/100 |
| 2013/0061064 A1 | 3/2013 | Ananthakrishnan et al. | |
| 2013/0080803 A1 | 3/2013 | Ananthakrishnan et al. | |
| 2013/0080804 A1 | 3/2013 | Ananthakrishnan et al. | |
| 2013/0111120 A1 | 5/2013 | Ananthakrishnan et al. | |
| 2013/0111121 A1 | 5/2013 | Ananthakrishnan et al. | |
| 2013/0111226 A1 | 5/2013 | Ananthakrishnan et al. | |
| 2013/0111236 A1 | 5/2013 | Ananthakrishnan et al. | |
| 2014/0068290 A1 | 3/2014 | Bhandaru et al. | |

OTHER PUBLICATIONS

Dean Kent, CPU power requirements, Nov. 14, 1998, www.realworldtech.com/cpu-power-requirements/.*
International Searching Authority, "Notification of Transmittal of the International Search Report and the Written Opinion of the International Searching Authority," mailed Mar. 25, 2013, in International application No. PCT/US2012/069121.
Intel Developer Forum, IDF2010, Opher Kahn, et al., "Intel Next Generation Microarchitecture Codename Sandy Bridge: New Processor Innovations," Sep. 13, 2010, 58 pages.
SPEC-Power and Performance, Design Overview V1.10, Standard Performance Information Corp., Oct. 21, 2008, 6 pages.
Intel Technology Journal, "Power and Thermal Management in the Intel Core Duo Processor," May 15, 2006, pp. 109-122.
Anoop Iyer, et al., "Power and Performance Evaluation of Globally Asynchronous Locally Synchronous Processors," 2002, pp. 1-11.
Greg Semeraro, et al., "Hiding Synchronization Delays in a GALS Processor Microarchitecture," 2004, pp. 1-13.
Joan-Manuel Parcerisa, et al., "Efficient Interconnects for Clustered Microarchitectures," 2002, pp. 1-10.
Grigorios Magklis, et al., "Profile-Based Dynamic Voltage and Frequency Scaling for a Multiple Clock Domain Microprocessor," 2003, pp. 1-12.
Greg Semeraro, et al., "Dynamic Frequency and Voltage Control for a Multiple Clock Domain Architecture," 2002, pp. 1-12.
Greg Semeraro, "Energy-Efficient Processor Design Using Multiple Clock Domains with Dynamic Voltage and Frequency Scaling," 2002, pp. 29-40.
Diana Marculescu, "Application Adaptive Energy Efficient Clustered Architectures," 2004, pp. 344-349.
L. Benini, et al., "System-Level Dynamic Power Management," 1999, pp. 23-31.
Ravindra Jejurikar, et al., "Leakage Aware Dynamic Voltage Scaling for Real-Time Embedded Systems," 2004, pp. 275-280.
Ravindra Jejurikar, et al., "Dynamic Slack Reclamation With Procrastination Scheduling in Real-Time Embedded Systems," 2005, pp. 13-17.
R. Todling, et al., "Some Strategies for Kalman Filtering and Smoothing," 1996, pp. 1-21.
R.E. Kalman, "A New Approach to Linear Filtering and Prediction Problems," 1960, pp. 1-12.
International Application No. PCT/US2012/028865, filed Mar. 13, 2012, entitled "Providing Efficient Turbo Operation of a Processor," by Intel Corporation.
International Application No. PCT/US2012/028902, filed Mar. 13, 2012, entitled "Dynamically Controlling Interconnect Frequency in a Processor," by Intel Corporation.
International Application No. PCT/US2012/028876, filed Mar. 13, 2012, entitled "Dynamically Computing an Electrical Design Point (EDP) for a Multicore Processor," by Intel Corporation.
Intel Corporation, "Intel 64 and IA-32 Architectures Software Developer's Manual," vol. 3 (3A, 3B & 3C): System Programming Guide, Feb. 2014, Chapter 14 Power and Thermal Management (14.1-14.9.5), 44 pages.
Taiwan Patent Office, Taiwan Office Action Mailed Nov. 12, 2014, in Taiwan Application No. 101146196. (Redacted).

* cited by examiner

METHOD, APPARATUS, AND SYSTEM FOR ENERGY EFFICIENCY AND ENERGY CONSERVATION INCLUDING CONFIGURABLE MAXIMUM PROCESSOR CURRENT

FIELD

This disclosure pertains to energy efficiency and energy conservation in integrated circuits, as well as code to execute thereon, and in particular but not exclusively, to configuring maximum current for processors.

BACKGROUND

Advances in semi-conductor processing and logic design have permitted an increase in the amount of logic that may be present on integrated circuit devices. As a result, computer system configurations have evolved from a single or multiple integrated circuits in a system to multiple hardware threads, multiple cores, multiple devices, and/or complete systems on individual integrated circuits. Additionally, as the density of integrated circuits has grown, the power requirements for computing systems (from embedded systems to servers) have also escalated. Furthermore, software inefficiencies, and its requirements of hardware, have also caused an increase in computing device energy consumption. In fact, some studies indicate that computers consume a substantial amount of the entire electricity supply for the United States of America.

As a result, there is a vital need for energy efficiency and conservation associated with integrated circuits. And as servers, desktop computers, notebooks, ultrabooks, tablets, mobile phones, processors, embedded systems, etc. become even more prevalent (from inclusion in the typical computer, automobiles, and televisions to biotechnology), the effect of computing device sales stretches well outside the realm of energy consumption into a substantial, direct effect on economic systems.

When power consumption becomes more of a factor, the trend towards always increasing performance is now being counterbalanced with power consumption concerns. Therefore, many silicon devices, such as processors, are run at a nominal, operating current (i.e. a certain supported frequency), and a 'turbo frequency' (i.e. a temporary maximum) frequency is provided for the device. As a result during certain times, the processor may temporarily run at the higher, maximum turbo frequency. Unfortunately, a turbo frequency is typically fused (e.g. permanently selected) for a processor part based on assumptions of both the processor's electrical capability and a platform's electrical capability/configuration. Yet, when a processor designer is fusing a frequency, which may be placed in any number of differently designed platforms, the processor designer usually selects a safe turbo frequency (i.e. a frequency with guard band to ensure it operates in all platforms). Consequently, the turbo frequency may be accurate for the most restrictive platform, but substantial potential performance is often left on the table for more robustly designed platforms.

BRIEF DESCRIPTION OF THE DRAWINGS

The present invention is illustrated by way of example and not intended to be limited by the figures of the accompanying drawings.

DETAILED DESCRIPTION

In the following description, numerous specific details are set forth, such as examples of specific types of specific processor and system configurations, specific hardware structures, specific architectural and micro architectural details, specific register configurations, specific algorithms for determining energy consumption, specific types of performance metrics, specific maximum currents, specific frequencies, specific device types, specific table formats and locations, specific power events, etc. in order to provide a thorough understanding of the present invention. It will be apparent, however, to one skilled in the art that these specific details need not be employed to practice the present invention. In other instances, well known components or methods, such as specific and alternative processor architectures, specific logic circuits/code for described algorithms, specific firmware code, specific interconnect operation, specific maximum current determination, and other specific operational details of processors haven't been described in detail in order to avoid unnecessarily obscuring the present invention.

Although the following embodiments are described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems. And may be also used in other devices, such as handheld devices, systems on a chip (SOC), and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future balanced with performance considerations.

The method and apparatus described herein are for providing configurable maximum current for integrated circuits.

Specifically, configurable maximum current is primarily discussed below in reference to a microprocessor. Yet, the apparatus' and methods described herein are not so limited, as they may be implemented in conjunction with any integrated circuit device. For example, configurable maximum current may be utilized for a graphics device. Or it may be utilized in small form-factor devices, handheld devices, SOCs, or embedded applications, as discussed above.

Figure 1:
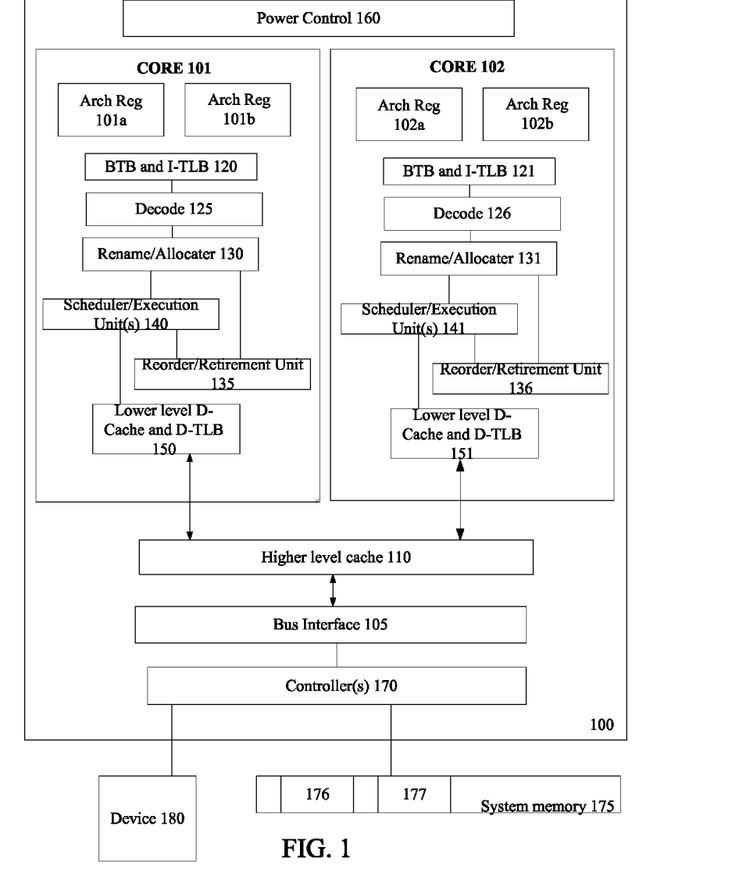
FIG. 1 illustrates an embodiment of a logical representation of a system including processor having multiple processing elements (2 cores and 4 thread slots).

Referring to FIG. 1, an embodiment of a processor including multiple cores is illustrated. Processor 100 includes any processor or processing device, such as a microprocessor, an embedded processor, a digital signal processor (DSP), a network processor, a handheld processor, an application processor, a co-processor, or other device to execute code. Processor 100, in one embodiment, includes at least two cores—core 101 and 102, which may include asymmetric cores or symmetric cores (the illustrated embodiment). However, processor 100 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 100, as illustrated in FIG. 1, includes two cores, core 101 and 102. Here, core 101 and 102 are considered symmetric cores, i.e. cores with the same configurations, functional units, and/or logic. In another embodiment, core 101 includes an out-of-order processor core, while core 102 includes an in-order processor core. However, cores 101 and 102 may be individually selected from any type of core, such as a native core, a software managed core, a core adapted to execute a native Instruction Set Architecture (ISA), a core adapted to execute a translated Instruction Set Architecture (ISA), a co-designed core, or other known core. Yet to further the discussion, the functional units illustrated in core 101 are described in further detail below, as the units in core 102 operate in a similar manner.

As depicted, core 101 includes two hardware threads 101a and 101b, which may also be referred to as hardware thread slots 101a and 101b. Therefore, software entities, such as an operating system, in one embodiment potentially view processor 100 as four separate processors, i.e. four logical processors or processing elements capable of executing four software threads concurrently. As eluded to above, a first thread is associated with architecture state registers 101a, a second thread is associated with architecture state registers 101b, a third thread may be associated with architecture state registers 102a, and a fourth thread may be associated with architecture state registers 102b. Here, each of the architecture state registers (101a, 101b, 102a, and 102b) may be referred to as processing elements, thread slots, or thread units, as described above. As illustrated, architecture state registers 101a are replicated in architecture state registers 101b, so individual architecture states/contexts are capable of being stored for logical processor 101a and logical processor 101b. In core 101, other smaller resources, such as instruction pointers and renaming logic in rename allocater logic 130 may also be replicated for threads 101a and 101b. Some resources, such as re-order buffers in reorder/retirement unit 135, ILTB 120, load/store buffers, and queues may be shared through partitioning. Other resources, such as general purpose internal registers, page-table base register(s), low-level data-cache and data-TLB 115, execution unit(s) 140, and portions of out-of-order unit 135 are potentially fully shared.

Processor 100 often includes other resources, which may be fully shared, shared through partitioning, or dedicated by/to processing elements. In FIG. 1, an embodiment of a purely exemplary processor with illustrative logical units/resources of a processor is illustrated. Note that a processor may include, or omit, any of these functional units, as well as include any other known functional units, logic, or firmware not depicted. As illustrated, core 101 includes a simplified, representative out-of-order (OOO) processor core. But an in-order processor may be utilized in different embodiments. The OOO core includes a branch target buffer 120 to predict branches to be executed/taken and an instruction-translation buffer (I-TLB) 120 to store address translation entries for instructions.

Core 101 further includes decode module 125 coupled to fetch unit 120 to decode fetched elements. Fetch logic, in one embodiment, includes individual sequencers associated with thread slots 101a, 101b, respectively. Usually core 101 is associated with a first Instruction Set Architecture (ISA), which defines/specifies instructions executable on processor 100. Often machine code instructions that are part of the first ISA include a portion of the instruction (referred to as an opcode), which references/specifies an instruction or operation to be performed. Decode logic 125 includes circuitry that recognizes these instructions from their opcodes and passes the decoded instructions on in the pipeline for processing as defined by the first ISA. For example, as discussed in more detail below decoders 125, in one embodiment, include logic designed or adapted to recognize specific instructions, such as transactional instruction. As a result of the recognition by decoders 125, the architecture or core 101 takes specific, predefined actions to perform tasks associated with the appropriate instruction. It is important to note that any of the tasks, blocks, operations, and methods described herein may be performed in response to a single or multiple instructions; some of which may be new or old instructions.

In one example, allocator and renamer block 130 includes an allocator to reserve resources, such as register files to store instruction processing results. However, threads 101a and 101b are potentially capable of out-of-order execution, where allocator and renamer block 130 also reserves other resources, such as reorder buffers to track instruction results. Unit 130 may also include a register renamer to rename program/instruction reference registers to other registers internal to processor 100. Reorder/retirement unit 135 includes components, such as the reorder buffers mentioned above, load buffers, and store buffers, to support out-of-order execution and later in-order retirement of instructions executed out-of-order.

Scheduler and execution unit(s) block 140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 150 are coupled to execution unit(s) 140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 101 and 102 share access to higher-level or further-out cache 110, which is to cache recently fetched elements. Note that higher-level or further-out refers to cache levels increasing or getting further way from the execution unit(s). In one embodiment, higher-level cache 110 is a last-level data cache—last cache in the memory hierarchy on processor 100—such as a second or third level data cache. However, higher level cache 110 is not so limited, as it may be associated with or include an instruction cache. A trace cache—a type of instruction cache—instead may be coupled after decoder 125 to store recently decoded traces.

In the depicted configuration, processor 100 also includes bus interface module 105. Historically, controller 170, which is described in more detail below, has been included in a computing system external to processor 100. In this scenario, bus interface 105 is to communicate with devices external to processor 100, such as system memory 175, a chipset (often including a memory controller hub to connect to memory 175 and an I/O controller hub to connect peripheral devices), a memory controller hub, a northbridge, or other integrated circuit. And in this scenario, bus 105 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 175 may be dedicated to processor 100 or shared with other devices in a system. Common examples of types of memory 175 include dynamic random access memory (DRAM), static RAM (SRAM), non-volatile memory (NV memory), and other known storage devices. Note that device 180 may include a graphic accelerator, processor or card coupled to a memory controller hub, data storage coupled to an I/O controller hub, a wireless transceiver, a flash device, an audio controller, a network controller, or other known device.

Note however, that in the depicted embodiment, the controller 170 is illustrated as part of processor 100. Recently, as more logic and devices are being integrated on a single die, such as System on a Chip (SOC), each of these devices may be incorporated on processor 100. For example in one embodiment, memory controller hub 170 is on the same package and/or die with processor 100. Here, a portion of the core (an on-core portion) includes one or more controller(s) 170 for interfacing with other devices such as memory 175 or a graphics device 180. The configuration including an interconnect and controllers for interfacing with such devices is often referred to as an on-core (or un-core configuration). As an example, bus interface 105 includes a ring interconnect with a memory controller for interfacing with memory 175 and a graphics controller for interfacing with graphics processor 180. Yet, in the SOC environment, even more devices, such as the network interface, co-processors, memory 175, graphics processor 180, and any other known computer devices/interface may be integrated on a single die or integrated circuit to provide small form factor with high functionality and low power consumption.

In one embodiment, processor 100 is capable of executing a compiler, optimization, and/or translator code 177 to compile, translate, and/or optimize application code 176 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etc. in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Similar to a compiler, a translator, such as a binary translator, translates code either statically or dynamically to optimize and/or translate code. Therefore, reference to execution of code, application code, program code, or other software environment may refer to: (1) execution of a compiler program(s), optimization code optimizer, or translator either dynamically or statically, to compile program code, to maintain software structures, to perform other operations, to optimize code, or to translate code; (2) execution of main program code including operations/calls, such as application code that has been optimized/compiled; (3) execution of other program code, such as libraries, associated with the main program code to maintain software structures, to perform other software related operations, or to optimize code; or (4) a combination thereof Previously, a processor, such as processor 100, usually only had one maximum current option available; and it was typically pre-selected by the processor manufacturer based on electrical assumptions of the processor part and associated platforms. Therefore, in one embodiment, processor 100 is capable of providing (or selecting between) multiple maximum current options. For example, the manufacturer for processor 100 fuses a set of maximum current values for processor 100. And since current often directly affects the frequency of a processor, each maximum current value may be associated with one or more maximum frequencies.

Here, it may be noted that when more logic (i.e. multiple cores) are active with the same maximum current, then often a lesser frequency is available. Therefore, each maximum current, in one embodiment, is associated with a maximum frequency for each combination of active processing elements. For example, assume that maximum current values of 25 A, 50 A, 75 A, and 100 A are provided for core 100 and nominal (or base) operating frequency of processor 100 is 3.0 GHz. In this scenario, each of the maximum current values, such as 100 A, is associated with a first temporary (or turbo) maximum frequency for one core active (either core 101 or 102) and a second turbo frequency for both cores being active.

In the world of turbo frequencies, it's common to refer to turbo frequencies in their relative amount above operating frequency. In fact, such relative frequency is often referred to in buckets or bins of frequency above an operating frequency of processor 100. Continuing the example from above, assume a bin of frequency includes 100 MH, the first turbo frequency for one core of processor 100 being active includes 3.9 GHz, and the second turbo frequency for both cores of processor 100 being active includes 3.5 GHz. As a result, it may be said that the maximum current value of 100 A for processor 100 is associated with 9 bins of frequency for one core being active and 5 bins for both cores being active.

In one embodiment, maximum current configuration options for processor 100 are made available to processor 100 through Performance Supported States (PSSs) in a Basic Input/Output Software (BIOS) interface. Platform designers and manufacturers, such as manufacturers of motherboards to accept processor 100, may then design to the processor manufacturer's design specifications regarding power delivery for processor 100. And if those platform designers so choose, they may design towards higher or lower maximum current options by optimizing the power delivery network within those specifications. Consequently, each platform designer is able customize their design and select the most accurate maximum current configuration option from the multiple available options. As a potential advantage, the highest performance maximum current configuration is utilized in each platform to obtain the highest possible frequency and performance, instead of relying on a single, conservative, assumption-based maximum current value for processor 100 regardless of the platform.

Moreover, in one embodiment, either as an alternative or in conjunction with static current configuration, dynamic selection of a maximum current configuration from multiple maximum current options is utilized. Here, processor 100, code executed thereon, BIOS, other module, or combination thereof dynamically selects an optimal maximum current based on the existing electrical characteristics of processor 100 or the platform for processor 100. For example, a new maximum current configuration is selected upon detecting a power event or current configuration event, such as removal of a power supply, addition of a power supply, high thermal density, low thermal density, power policy decision, power limit being reached, etc.

As a specific illustrative example, assume a maximum current configuration is initially selected. And then a power supply is removed (a user unplugs an A/C brick for a notebook from the wall). According to power policy, a platform designer may desire less maximum current and less turbo frequency to save power. Therefore, hardware, software, firmware, or a combination thereof selects a lower maximum current configuration to conserve power. And similarly, the maximum current configuration is dynamically reselected when the notebook is plugged back in. In this illustrative scenario, registers in processor 100, such as Model Specific Registers, which may be made accessible to hardware, software, firmware, or a combination thereof, are utilized in the selection of a maximum current configuration. Consequently, whether static or dynamic selection of a maximum current configuration is utilized, the selection is made intelligently per platform to achieve the best possible performance for each platform, instead of a general maximum current assumption that potentially results in less performance to ensure compatibility.

Figure 2:
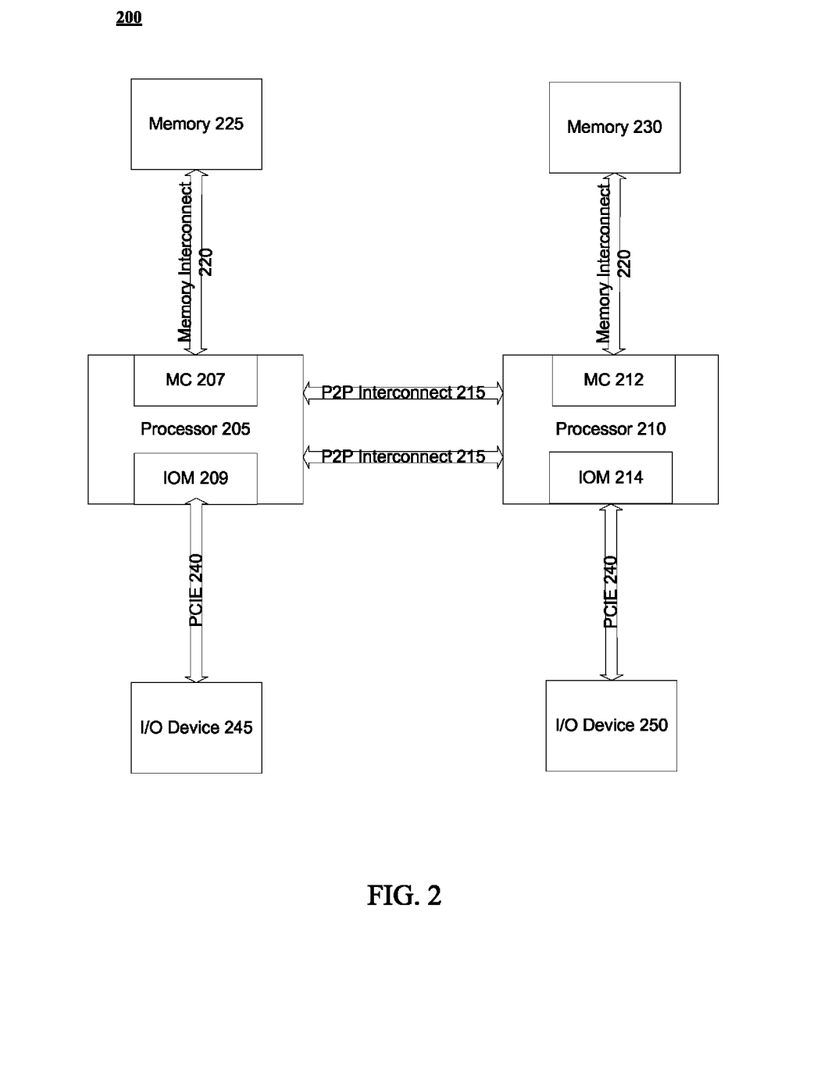
FIG. 2 illustrates an embodiment of a logical representation of a computer system configuration.
Figure 3:
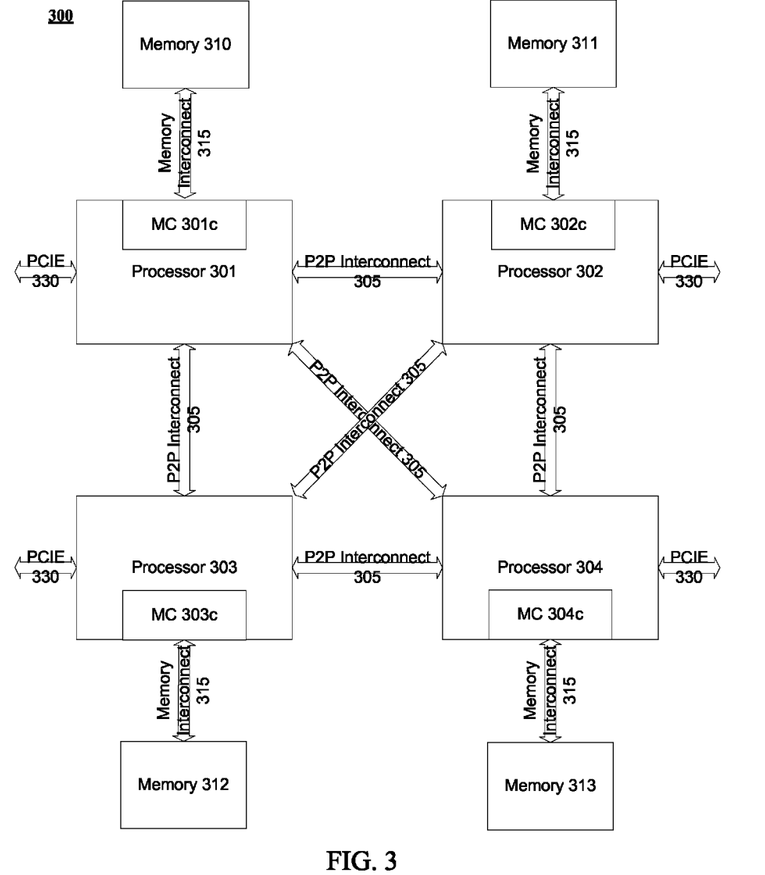
FIG. 3 illustrates another embodiment of a logical representation of a computer system configuration.
Figure 4:
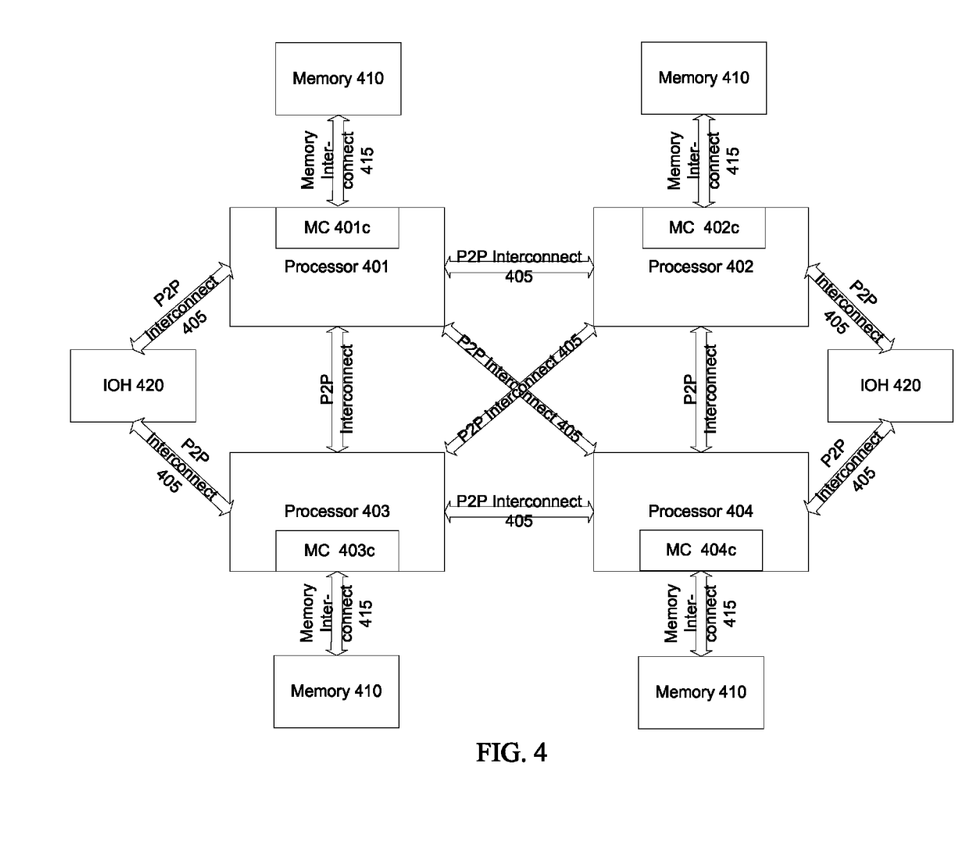
FIG. 4 illustrates another embodiment of a logical representation of a computer system configuration.

Referring to FIGS. 2-4, embodiments of a computer system configurations adapted to include processors with configurable maximum current is illustrated. In reference to FIG. 2, an illustrative example of a two processor system 200 with an integrated memory controller and Input/Output (I/O) controller in each processor 205, 210 is illustrated. Although not discussed in detail to avoid obscuring the discussion, platform 200 illustrates multiple interconnects to transfer information between components. For example, point-to-point (P2P) interconnect 215, in one embodiment, includes a serial P2P, bi-directional, cache-coherent bus with a layered protocol architecture that enables high-speed data transfer. Moreover, a commonly known interface (Peripheral Component Interconnect Express, PCIE) or variant thereof is utilized for interface 240 between I/O devices 245, 250. However, any known interconnect or interface may be utilized to communicate to or within domains of a computing system.

Turning to FIG. 3 a quad processor platform 300 is illustrated. As in FIG. 2, processors 301-304 are coupled to each other through a high-speed P2P interconnect 305. And processors 301-304 include integrated controllers 301*c*-304*c*. FIG. 4 depicts another quad core processor platform 400 with a different configuration. Here, instead of utilizing an on-processor I/O controller to communicate with I/O devices over an I/O interface, such as a PCI-E interface, the P2P interconnect is utilized to couple the processors and I/O controller hubs 420. Hubs 420 then in turn communicate with I/O devices over a PCIE-like interface.

Figure 5:
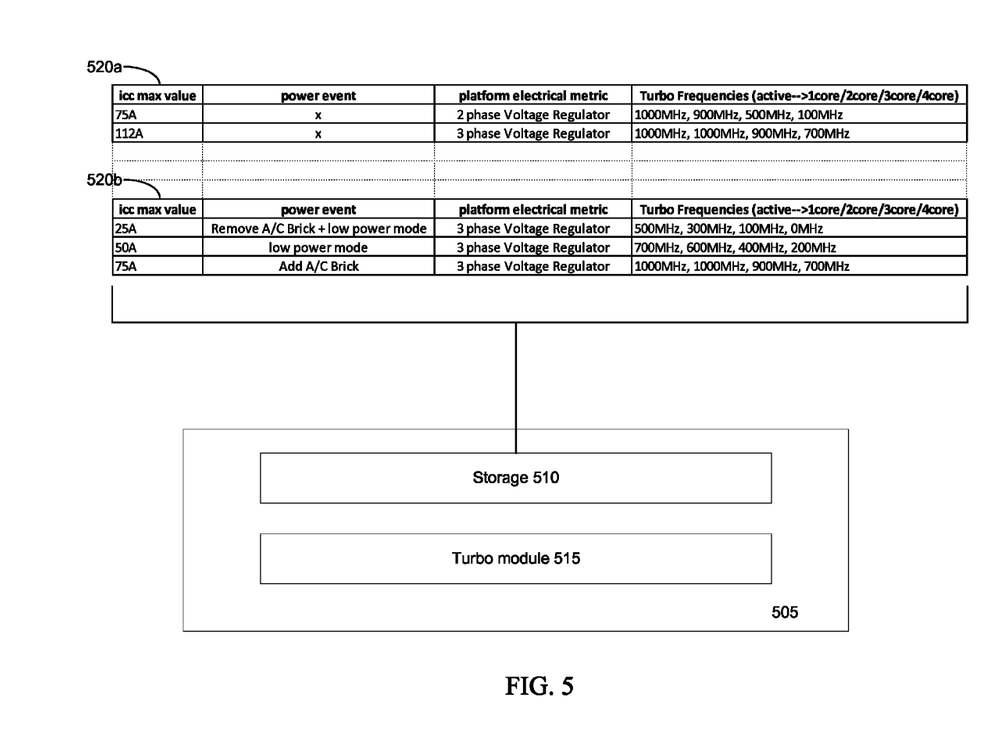
FIG. 5 illustrates an embodiment of a logical representation of a device to provide multiple maximum current configuration options for maximum frequencies.

Referring next to FIG. 5, an embodiment of a logical representation of a processor to provide for and/or select between multiple maximum current configuration options is illustrated. As aforementioned, device 505 includes any integrated circuit device, such as a processor, SOC, microcontroller, etc. For example, device 505 includes a multi-processing element (multi-core or multi-hardware thread) processor.

In one embodiment, processor 505 includes storage 510 to hold a representation of a plurality of maximum current configurations for a device. Storage 510 includes any known storage structure, such as one or more register(s), a cache, a memory device, etc. Here, each of the maximum current configurations is associated with a plurality of maximum turbo frequencies. For example, a turbo frequency (or bins of frequency available) is provided for each combination of an active processing element in processor 505. So, if processor 505 includes 8 cores, then eight maximum frequencies are provided in this illustration (i.e. a first number of frequency bins for one of eight cores active, a second number of frequency bins for two of eight cores active, etc.).

Although storage 510 is illustrated within device 505, such storage locality is not required. In fact, storage 510, in one embodiment, is held in non-volatile memory, such as a Basic Input/Output Software (BIOS) flash memory device. As a combination, a representation of multiple current configurations may be held outside processor 505. And one or more of those configurations may be written to storage inside processor 505, such as Model Specific Registers (MSRs) 510 within processor 505.

Regardless of placement, storage 510, as a first example, is to hold table 520a, 520b, or a combination thereof. Here, maximum current values, such as 75 A and 112 A, in table 520a are associated with a plurality of maximum turbo frequencies. In the depicted embodiment, it's assumed that processor 505 includes four processing elements, such as 4 cores. So, four turbo frequencies are provided per maximum current (e.g. for 112 A ->1000 MHz or 10 bins available for 1 core active, 1000 MHz or 10 bins available for 2 cores active, 900 MHz or 9 bins available for 3 cores active, and 700 MHz or 7 bins available for 3 cores active.

As can be seen from the simplified example of table 520a, there is a potentially substantial difference between maximum current configurations (i.e. 1 bin more available with 2 cores active, 4 bins more available with 3 cores active, and 6 bins more available with 4 cores active). However, if processor 505 was purely limited to one maximum current configuration, then the manufacturer may have chosen 75 A to ensure processor 505 operates correctly within each possible platform, including a platform with only a two phase voltage regulator. But usage of the 75 A current configuration in a platform with a 3 phase voltage regulator potentially leaves all the extra turbo frequency and associated performance on the table.

As a result, in one embodiment, turbo module 515 is to select, utilize, and/or implement turbo frequency from a selected configuration among multiple possible configurations. For example, when a workload demands additional performance, turbo module 515 is to boost the frequency within the constraints of the configuration (i.e. if the 75 A maximum current value is selected from table 520a and 3 cores are active, then the operating frequency is boosted by up to 500 MHz). However, a boost frequency may be limited by other considerations, such as estimated current consumption, estimated power consumption, processor temperature, a power limit, an indication by a power unit, or other known current related metric. As an illustrative example, assume a workload requests additional performance and based on the selected configuration, turbo module 505 determines that 5 bins of frequency are available for additional performance. But if processor 505 is under thermal throttle conditions due to processor temperature, turbo module 505 may not increase the operating frequency at all according to the thermal throttle policy.

Figure 6:
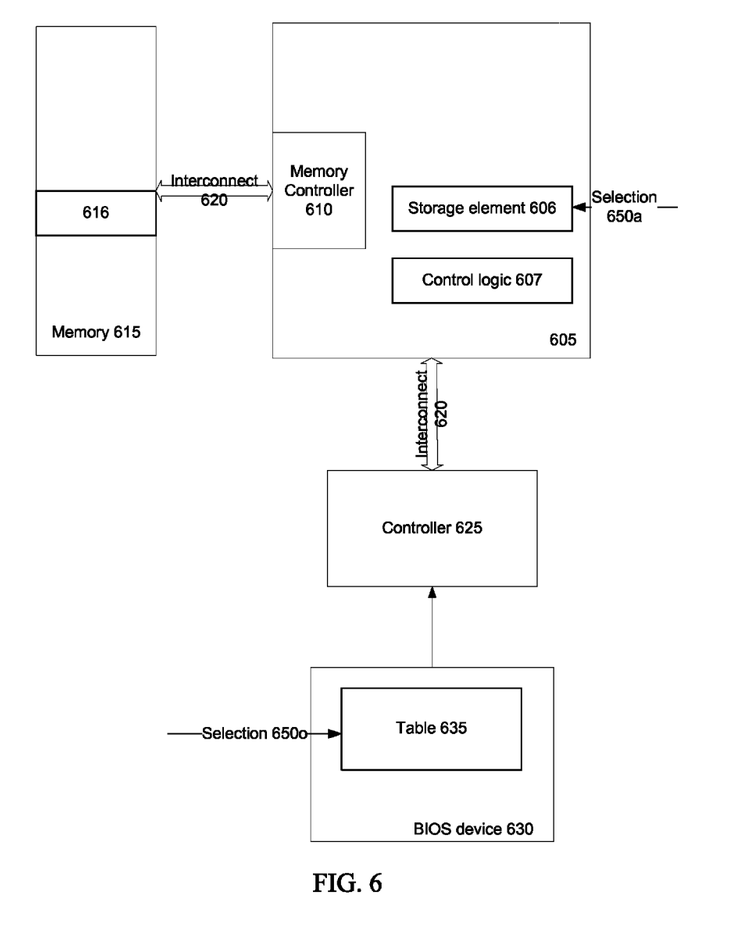
FIG. 6 illustrates another embodiment of a logical representation of a processor to provide multiple maximum current configuration options for maximum frequencies.

Referring next to FIG. 6, an illustrative embodiment of a platform to support selection of a maximum current configuration from a plurality of options is illustrated. Here, table 635, which may be similar to tables 520a, 520b, or a combination thereof, is held in BIOS device 630, such as non-volatile flash memory device. In one embodiment, a manufacturer of processor 605 fuses a set of maximum current configurations. And BIOS interprets the fuses to build table 635. Based on provided specifications, a customer (i.e. a motherboard, component, platform or other designer/manufacture) provides selection criteria 650o to select a maximum current configuration. As a first example, the selection criteria is a direct representation of the table entry or current value. Here, a platform manufacturer may directly select 112A from table 520a based on their usage of a 3 phase voltage regulator. Alternatively, the platform manufacturer indicates that a 3 phase voltage regulator is being utilized in the platform, and BIOS makes the selection of the appropriate current value entry in table 635. As yet another example, BIOS discovers electrical capabilities of the platform and makes the selection based on the discovered information 650o. Here, the platform may be tested and/or information about platform/component capabilities (e.g. a number of phases of a voltage regulator) is/are exposed to BIOS.

In one option, a selected configuration by a platform manufacturer is lockable (either permanently or semi-permanently). In a fully permanent scenario, once the selection is made and locked, then no other current configuration selection may be made. However, in a semi-permanent circumstance, the initial current configuration selection becomes a baseline or default. And dynamic selection (as discussed below) may be made based on defined events. However, the configuration returns to the default selection reset or normal operation. Note that in another embodiment, the current configuration is made fully modifiable.

Whether a current configuration is initially selected by a platform manufacturer based on platform electrical capabilities, a current configuration is selected by BIOS, a selection is initially made in another manner, or an initial selection is not made, in one embodiment a current configuration is dynamically selected during runtime. For example, in response to a current configuration event 650a, control logic 607 dynamically selects a maximum current configuration from a plurality of current configuration options, which is initially held in BIOS storage 630 in table 635. In one example, table 635 may be held in storage 606. In contrast, as in the illustrated embodiment storage element 606 is configured to hold the selected configuration, not the entire table 635. As discussed in more detail below, storage element 606 may be accessible to hardware, software, or a combination thereof to indicate or represent current configuration selection.

A current configuration event 650a includes any event, which indicates a maximum current configuration may be modified, such as a power event, a software indication, a user-indication, a thermal event, or other known event that would benefit from a change in maximum current. Examples of power events includes removal of a power supply; adding a power supply, receiving a request for more power, determining an additional processing element is active, determining an additional processing element is inactive, determining a workload requires more or less performance/power, and the device transitioning between power states. As another illustration, software (either privileged level software, user-level software, driver software, or a combination thereof) may perform a write to storage element 606, such as a register, (e.g. a write to memory mapped I/O space 616, which loads storage element 606) to select a current configuration. Here, the configuration options are exposed by BIOS, selected by the hardware/software, and implemented by control logic 607. In this scenario, the write from hardware/software is determined to be a current configuration event.

As a specific illustrative example, assume table 635 is holding the table information from table 520b. And MSR 606 holds a representation of the 50 A current configuration (i.e. entry 2 indicating that for a maximum current of 50 A there are maximum frequency bins available of 700, 600, 400, and 200 MHz for 1-4 cores being active, respectively), because a platform 600 is not plugged in and is in a power savings mode. A Power Control Unit (PCU)—micro-controller with collocated power code—that is not specifically shown but may be part of control logic 607, detects that platform 600 is plugged in. As a result, whether from software writing directly to storage element 606 or through memory mapped space 616; hardware interfacing with code, such as BIOS code; hardware or firmware (power unit, PCU, BIOS, etc.) directly updating storage element 606 based on control signals; or a combination thereof, a maximum current configuration (e.g. 75 A) of the plurality of maximum current configurations in table 635 is selected based on the addition of a power supply.

Although table 520b shows maximum current values associated with specific power events, such association is not required. In fact in one example, table 635 includes possible maximum current values associated with available bins of frequency for active processing elements. And when a power event is detected, a PSU or software determines an optimal current from table 635 based on the specific event or event type. In other words, in this scenario BIOS 630 exposes the possible configuration options of processor 605, and the platform designer, software designer, and/or user based on the implementation is tasked with selecting the most appropriate configuration from the provided options. The closer to runtime the policy decision of what maximum current configuration to select based on an event may provide for more flexibility and potential optimal selection. However, in some instances flexibility may be sacrificed to ensure proper operation and guaranteed performance minimums for different events.

Therefore as can be seen from above, in one embodiment, dynamic selection of a current configuration includes updating storage element 606 from an existing current configuration to a new current configuration option. And BIOS exposes the selection options, such that policy decision makers (hardware, software, firmware, or a combination thereof) is able to dynamically select the new current configuration option amongst those options based on runtime platform information and/or events. Note that dynamic selection of current configuration options may be implemented separately or in conjunction with initial selection by a platform manufacturer. For example, a processor designer fuses a plurality of maximum current options, which BIOS exposes for selection. Based on the platform VR design, a default maximum current is selected by platform designers. Furthermore, the platform manufacturers may select a subset of the originally available maximum current options to later expose to operating hardware and/or software. So during runtime, that hardware/software makes a dynamic selection from the exposed subset. Consequently, software and/or hardware is able to select a more suitable maximum current configuration through memory mapped I/O, a BIOS runtime interface, or a direct interface to processor registers. And when a workload requests more or less power consumption/performance, the processor is able to determine a suitable maximum/turbo frequency from the selected current configuration. Upon reboot, the maximum current configuration returns to the platform designer's default selection. By enabling more accurate maximum current selection at any different power constraints, more efficient energy consumption and utilization is provided.

Figure 7:
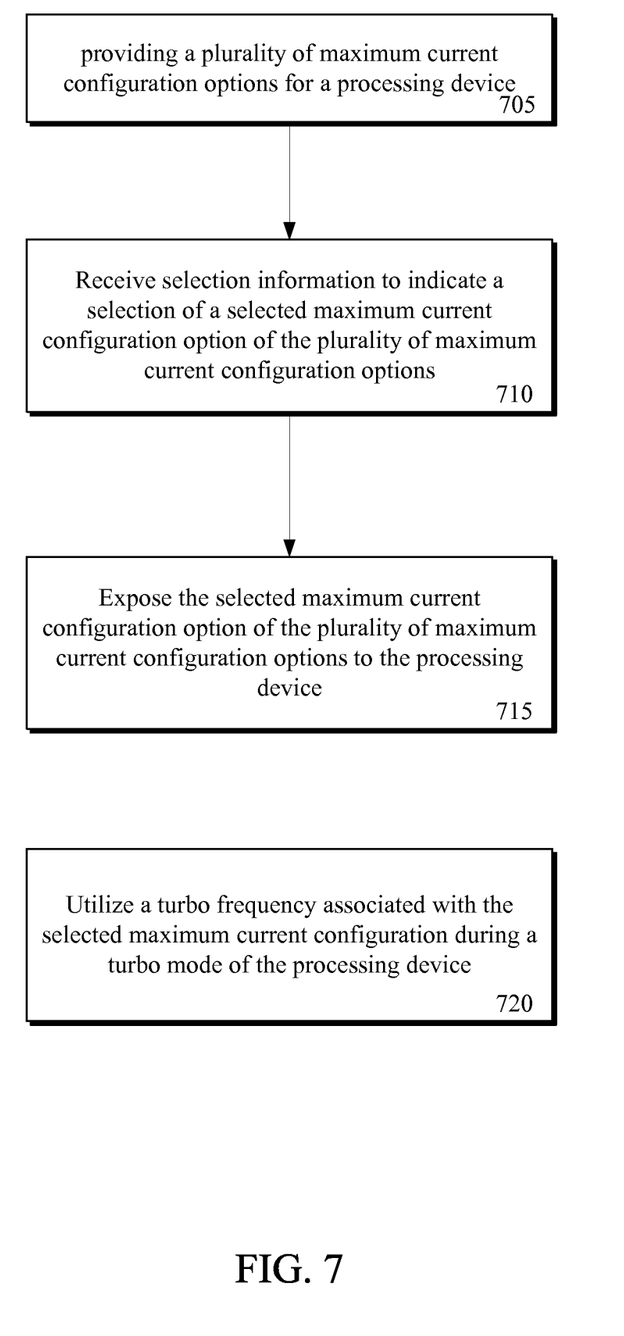
FIG. 7 illustrates an embodiment of a flow diagram for providing multiple maximum current configuration options to a computing device.

Moving to FIG. 7, an embodiment of modules and/or a representation of a flow diagram for a method of providing a plurality of maximum configuration options is shown. Note that the flows (or modules) are illustrated in a substantially serial fashion. However, both the serial nature of these flows, as well as the depicted order, is not required. For example, in reference to FIG. 7, receiving selection information may not be specifically performed. Instead, selection information may be generated, such as through dynamic self-determination of platform electrical capabilities. Also, flows 705-715 are illustrated in a substantially linear or serial fashion. However, the flows may be performed in parallel over the same time period. In addition, any of the illustrated flows or logical blocks may be performed within hardware, software, firmware, or a combination thereof. As stated above and below, each flow, in one embodiment, represents a module, portion of a module, or overlap of modules. Moreover, any program code in the form of one or more instructions or operations, when executed, may cause a machine to perform the flows illustrated and described below.

In flow 705, a plurality of maximum current configuration options for a processing device are provided. For example, one or more fuses, are set by a part designer to indicate the plurality of maximum current configuration options. And the fuses may be interpreted by hardware, software, or a combination thereof (e.g. BIOS) to indicate the available configuration options for a device. As an example, each maximum current configuration includes a representation of a maximum current corresponding to a representation of one or more associated maximum frequencies. The maximum frequencies may include absolute frequencies (a total frequency of a part or processing element thereof) or relative frequencies (frequency or bins of frequency available above a nominal or operating frequency).

In one embodiment, providing the maximum current configuration options includes holding a table of maximum current values with associated frequencies. For example, BIOS interprets fuses of a processor and builds a table in non-volatile memory, where each entry includes a maximum current value corresponding to available frequency. Here, the available frequency, in one embodiment, includes frequency available for each scenario of processing elements of the device being active and/or inactive. For example, if a processor has 8 cores, then there may be eight frequencies for a maximum current configuration (e.g. a frequency for each of 1, 2, 3 . . . 8 cores being active). In another embodiment, entries of the table also hold configuration indicators, such as associated power events (e.g. add or remove A/C brick) or platform electrical metrics (e.g. phases of a voltage regulator).

In flow 710, selection information to indicate a selected maximum current configuration option is received (during build, initialization, or runtime). As a first embodiment, selection information includes a form of election or selection of a current configuration. Examples of such a selection include hardware, BIOS, firmware, software, or a combination thereof referencing an entry of a table, referencing a maximum current value, referencing a power event, referencing a platform electrical capability, or other event/metric associated with a maximum current configuration. As a result of the variety of options for receiving selection information, many devices may receive the information. For example, BIOS may receive the selection information as user input from a platform manufacturer or the platform itself. A processor may receive such information through memory mapped I/O, a write to a register, or other bus from hardware, software, BIOS, firmware or a combination thereof.

As a specific illustrative example, a platform manufacturer selects an option in BIOS that a 3 phase voltage regulator is included for a processor. And BIOS receives that selection information and determines the appropriate maximum current configuration from the indication that a 3 phase voltage regulator is included. As another illustrative example, during runtime of a device, a current configuration event (e.g. removal of a power supply, addition of a power supply, a thermal power density indicator, a workload indicator, an electrical capability indicator, a runtime power event and a power limit) is detected. And a selection of a new current configuration is made based on the current configuration event (e.g. a write by hardware, software, firmware, or a combination thereof to a MSR in the processor is performed either directly or indirectly to select a new current configuration).

In one embodiment, a selected maximum current configuration is locked after receiving selection information. Continuing one of the examples from above, after a platform manufacturer provides electrical capability (selection) information, the selected maximum current configuration is determined. And then the selected configuration is locked, so a later modification, such as by an end-user, may not be made.

In flow 715, the selected maximum current configuration option is exposed to the processing device. Examples of exposing a configuration to a processor includes: writing a representation of the selected maximum current configuration option to one or more storage elements of the processing device; writing a representation of the selected maximum current configuration option to a memory space visible to the processing device; and allowing the processing device to read a representation of the selected maximum current configuration option from a storage medium holding the plurality of maximum current configuration options.

Next, in flow 720, a frequency associated with the selected current configuration is utilized during a turbo mode of the processing device. As an example, a workload requests or requires more performance. As a result, one or more registers in the processor hold the maximum current value and associated frequencies for different scenarios of active processing elements. So here, the processor determines how many processing elements, such as cores, are active (or inversely are inactive). And the appropriate available frequency from the maximum current and associated frequency for the determined processor activity. As a result, the processor is run a the higher (turbo) frequency for an amount of time to boost performance.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc, which are to be distinguished from the non-transitory mediums that may receive information there from.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A processor comprising:
a plurality of processing elements;
storage to hold a representation of a plurality of maximum current configurations for the processor, each of the maximum current configurations to be associated with a plurality of maximum turbo frequencies to be stored in the storage; and
a turbo module adapted to dynamically select a maximum current configuration of the plurality of maximum current configurations based on a power event, to determine a number of the plurality of processing elements that are active and, based on the number of the plurality of processing elements that are active, to determine a maximum turbo frequency of the plurality of maximum turbo frequencies associated with the selected maximum current configuration.

2. The processor of claim 1, wherein the storage includes a non-volatile memory to hold a table including a plurality of maximum current values, each of the maximum current values associated with the plurality of maximum turbo frequencies.

3. The processor of claim 1, wherein the storage includes one or more registers to hold a plurality of maximum current values associated with the plurality of maximum turbo frequencies.

4. The processor of claim 1, wherein the power event includes removal of a power supply, and wherein the turbo module to dynamically select a maximum current configuration of the plurality of maximum current configurations that includes a smaller maximum current value than a previous maximum current value in response to the removal of the power supply.

5. The processor of claim 1, wherein each of the maximum current configurations to be associated with a maximum turbo frequency for each integer number of the plurality of processing elements that are active.

6. The processor of claim 1, wherein each of the maximum current configurations is to further be associated with a corresponding power event and a platform electrical metric.

7. A processor comprising:
one or more registers adapted to hold a representation of a first maximum current configuration to correspond with a first set of maximum frequencies for the processor, the one or more registers further adapted to hold a representation of the first set of maximum frequencies; and
a control module adapted to update, during runtime of the processor, the one or more registers with a representation of a second maximum current configuration of a plurality of possible maximum current configurations, the second maximum current configuration to correspond with a second set of maximum frequencies, the control module to further update the one more registers with the second set of maximum frequencies and to thereafter determine a number of a plurality of processing elements of the processor that are active and, based on the number of the plurality of processing elements that are active, determine a maximum frequency of the second set of maximum frequencies at which the processor is to operate.

8. The processor of claim 7, wherein the one or more registers comprises one or more Model Specific Registers (MSRs).

9. The processor of claim 7, wherein the one or more registers being adapted to hold a first maximum current value corresponding to a first set of maximum frequencies including a maximum frequency for each combination of a number of processing elements that are active in the processor.

10. The processor of claim 9, wherein the control module being adapted to update, during runtime, the first maximum current value corresponding to the first set of maximum frequencies to a second maximum current value corresponding to the second set of maximum frequencies.

11. The processor of claim 9, wherein the control module comprises:
Basic Input/Output Software (BIOS) adapted to expose a plurality of maximum current configurations including the first and the second maximum current configurations to the processor and to write the second maximum current configuration to the one or more registers.

12. The processor of claim 9, wherein the control module is adapted to update the one or more registers with the representation of the second maximum current configuration in response to a power event, the power event being selected from a group consisting of plug in of a power supply, removal of a power supply, receipt of a request for more power, determination that an additional processing element is active, determination that an additional processing element is inactive, and the processor transition between power states.

13. A method comprising:
providing a set of maximum current values and corresponding turbo frequencies for a processor, wherein the set includes more than one maximum current value and each of the corresponding turbo frequencies is associated with a number of active cores of the processor; and
selecting a maximum current value and a corresponding turbo frequency of the set of maximum current values and corresponding turbo frequencies based on a maximum current configuration consideration and the number of active cores of the processor.

14. The method of claim 13, wherein the maximum current configuration consideration includes a runtime power event, the runtime power event being selected from a group consisting of removal of a power supply, addition of a power supply, a thermal power density indicator, a workload indicator, an electrical capability indicator, and a power limit, and wherein selecting the maximum current value and the corresponding turbo frequency is performed during runtime of the processor.

15. The method of claim 13, wherein the maximum current configuration consideration includes an electrical capability metric of a platform to include the processor.

16. The method of claim 15, wherein providing a set of maximum current values and corresponding turbo frequencies for a processor comprises holding a table of the set of maximum current values and corresponding turbo frequencies for the processor in Basic Input/Output Software (BIOS) firmware.

17. The method of claim 16, wherein holding a table of the set of maximum current values and corresponding turbo frequencies for the processor in Basic Input/Output Software (BIOS) firmware is in response to BIOS firmware interpreting fuses defining the set of maximum current values.

18. The method of claim 17, wherein selecting the maximum current value and the corresponding turbo frequency of the set of maximum current values and corresponding turbo frequencies based on the electrical capability metric includes receiving information with the BIOS firmware indicating the electrical capability metric and selecting the maximum current value and the corresponding turbo frequency from the table with the BIOS firmware according to predefined policy in the BIOS firmware with respect to the electrical capability metric.

19. The method of claim 18, wherein the electrical capability metric includes a number of phases of a voltage regulator to be associated with the processor.

* * * * *